(12) United States Patent
Taguchi et al.

(10) Patent No.: US 7,711,446 B2
(45) Date of Patent: May 4, 2010

(54) TRANSPORT APPARATUS

(75) Inventors: Kazuhiro Taguchi, Aichi-ken (JP);
Masayuki Uchida, Komaki-shi (JP)

(73) Assignee: Daifuku Co., Ltd., Osaka (JP)

( * ) Notice: Subject to any disclaimer, the term of this patent is extended or adjusted under 35 U.S.C. 154(b) by 1195 days.

(21) Appl. No.: 11/199,367

(22) Filed: Aug. 8, 2005

(65) Prior Publication Data

US 2006/0071043 A1 Apr. 6, 2006

(30) Foreign Application Priority Data

Aug. 9, 2004 (JP) .............................. 2004-232270

(51) Int. Cl.
*G06F 19/00* (2006.01)
(52) U.S. Cl. .......................... 700/112; 700/113; 701/19
(58) Field of Classification Search ................... 701/19;
700/112, 113; 198/300, 301
See application file for complete search history.

(56) References Cited

U.S. PATENT DOCUMENTS 5,979,334 A * 11/1999 Lund ........................ 104/88.04
2004/0016093 A1* 1/2004 Lueneburger et al. ......... 28/289

2004/0184901 A1 9/2004 Taguchi et al.

FOREIGN PATENT DOCUMENTS

| JP | 53093554 A | 8/1978 |
| JP | 1008108 A | 1/1989 |
| JP | 2210170 A | 8/1990 |
| JP | 2002-175117 | 6/2002 |
| JP | 2002175117 A * | 6/2002 |
| JP | 2004002006 A | 1/2004 |

* cited by examiner

*Primary Examiner*—Mark Hellner
*Assistant Examiner*—Helal A Algahaim
(74) *Attorney, Agent, or Firm*—The Webb Law Firm

(57) ABSTRACT

The transport apparatus is provided with a path that extends past a plurality of article transferring locations, a plurality of article transporting vehicles that run on the path, a travel driving means provided on each of the article transporting vehicles for controlling movement of the article transporting vehicle, and a ground-side controller for managing operation of the plurality of article transporting vehicles by managing the travel driving means, wherein the ground-side controller is capable of transmitting run command information and stop command information, relating to each of the article transporting vehicles, to their corresponding travel driving means, and wherein the travel driving means drives and stops the article transporting vehicles based on the run command information and the stop command information from the ground-side controller.

2 Claims, 2 Drawing Sheets

TRANSPORT APPARATUS

BACKGROUND OF THE INVENTION

The present invention relates to transport apparatuses having a plurality of article transporting vehicles that travel on a path extending past a plurality of article transferring locations.

The above-described transport apparatus can be used, for example, in an automated warehouse. An improvement in the transport capacity can be achieved, for example, when a plurality of article transporting vehicles are led to travel back and forth on a linear path having two ends, so that the plurality of article transporting vehicles carry articles to a plurality of article transferring locations.

Such transport apparatuses are conventionally configured such that two article transporting vehicles are provided, wherein each of the two article transporting vehicles is provided with travel driving means for drivably running the article transporting vehicle and a vehicle-side controller for controlling the operation of the travel driving means, to control the driving and the stopping of the article transporting vehicle, and wherein the two drive-side controllers control the travel driving means while communicating information on, for example, a running status of the other article transporting vehicle, between themselves (see JP 2002-175117A, for example).

In the above-described conventional transport apparatus, the travel driving means operates while the drive-side controllers communicate information on, for example, the running status of their article transporting vehicles, and thus it is necessary to operate the travel driving means with consideration to the communications between the drive-side controllers.

More specifically, the travel driving means operates after the communications between the drive-side controllers, and thus a time lag for the time taken for the communications between the drive-side controllers is generated before the travel driving means operates. Therefore, it is necessary to manage the operation of the plurality of article transporting vehicles with consideration to this time lag.

For example, if managing the operation of the plurality of article transporting vehicles such that the vehicle-to-vehicle distance between the article handling vehicles is equal to or greater than a set vehicle-to-vehicle distance, then it is necessary to set the set vehicle-to-vehicle distance to be larger by a distance that is equivalent to the time lag taken for communications between the vehicle-side controllers, and thus there is a risk of a loss of transport capacity when articles cannot be transferred at the same time to two article transferring locations at which the article transporting vehicles are in proximity to each other.

SUMMARY OF THE INVENTION

It is an object of the present invention to provide a transport apparatus to address the problem as described above.

The transport apparatus according to the present invention is provided with a path that extends past a plurality of article transferring locations, a plurality of article transporting vehicles that run on the path, a travel driving means provided on each of the article transporting vehicles for controlling movement of the article transporting vehicle, and a ground-side controller for managing operation of the plurality of article transporting vehicles by managing the travel driving means, wherein the ground-side controller is capable of transmitting run command information and stop command information, relating to each of the article transporting vehicles, to their corresponding travel driving means, and wherein the travel driving means drives and stops the article transporting vehicles based on the run command information and the stop command information from the ground-side controller.

Thus, according to the present invention, the ground-side controller is capable of managing the operation of the plurality of the article transporting vehicles while directly controlling the operation of the travel driving means. With this configuration, it is possible to perform at least a part of the operation of the travel driving means without depending on the communications between drive-side controllers.

DETAILED DESCRIPTION OF THE PREFERRED EMBODIMENTS

Embodiments of a transport apparatus according to the present invention will be described with reference to the drawings.

Figure 1:
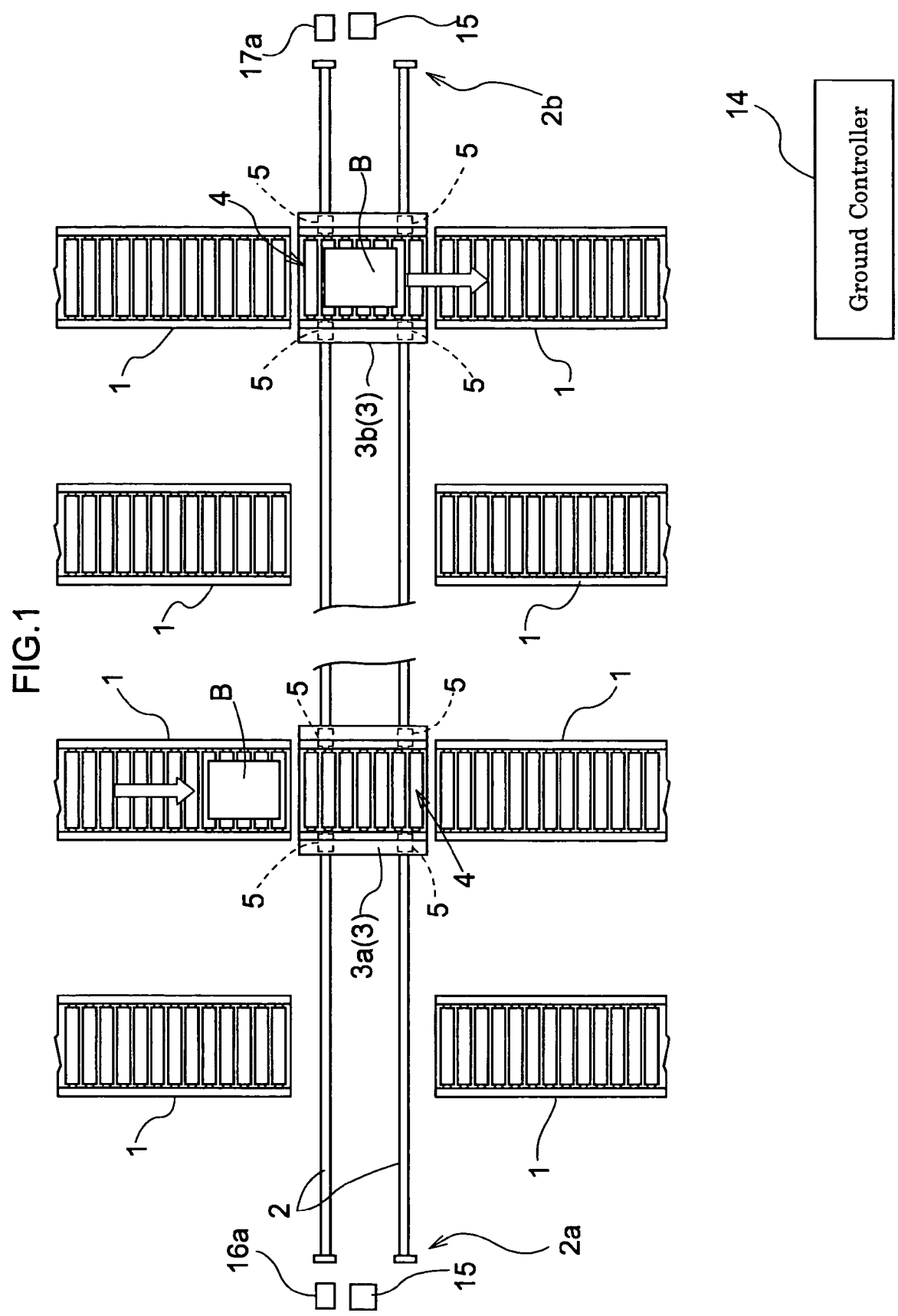
FIG. 1 is a plan view of a transport apparatus according to the present invention.

The transport apparatus is applied to an automated warehouse and the like provided with article storage racks, and is provided with a plurality of article handling vehicles 3 serving as article transporting vehicles that travel on a path 2 extending past a plurality of stations 1 serving as article transferring locations, as shown in FIG. 1. The plurality of article handling vehicles 3 travel back and forth on the path 2 and carry an article B between the plurality of stations 1.

The path 2 has a linear form having two ends 2a and 2b. The plurality of stations 1 are arranged on both of the right and left sides of the path 2, with intervals between them along the longitudinal direction of the path 2.

The plurality of stations 1 include, in combination, an unloading station 1 provided with an unloading conveyer for carrying articles that are to be unloaded from article storage racks, a loading station 1 provided with a loading conveyer for carrying articles that are to be loaded into the article storage racks, a carry-in station 1 provided with a carry-in conveyer for carrying articles that are to be carried in from the outside, and a carry-out station 1 provided with a carry-out conveyer for carrying articles that are to be carried out to the outside.

Two article handling vehicles 3, more specifically, a first article handling vehicle 3a and a second article handling vehicle 3b, are provided, and each of the first article handling vehicle 3a and the second article handling vehicle 3b is provided with, for example, an electric powered transfer device 4, such as a roller conveyer, that transfers the article B between the article handling vehicle 3 itself and the station 1, and a plurality of running wheels 5 that travel on a travel rail disposed along the path 2.

The running wheels 5 have drive-running wheels 5 that are driven by an electric motor 6 and a driven running wheels 5 that can rotate freely.

Figure 2:
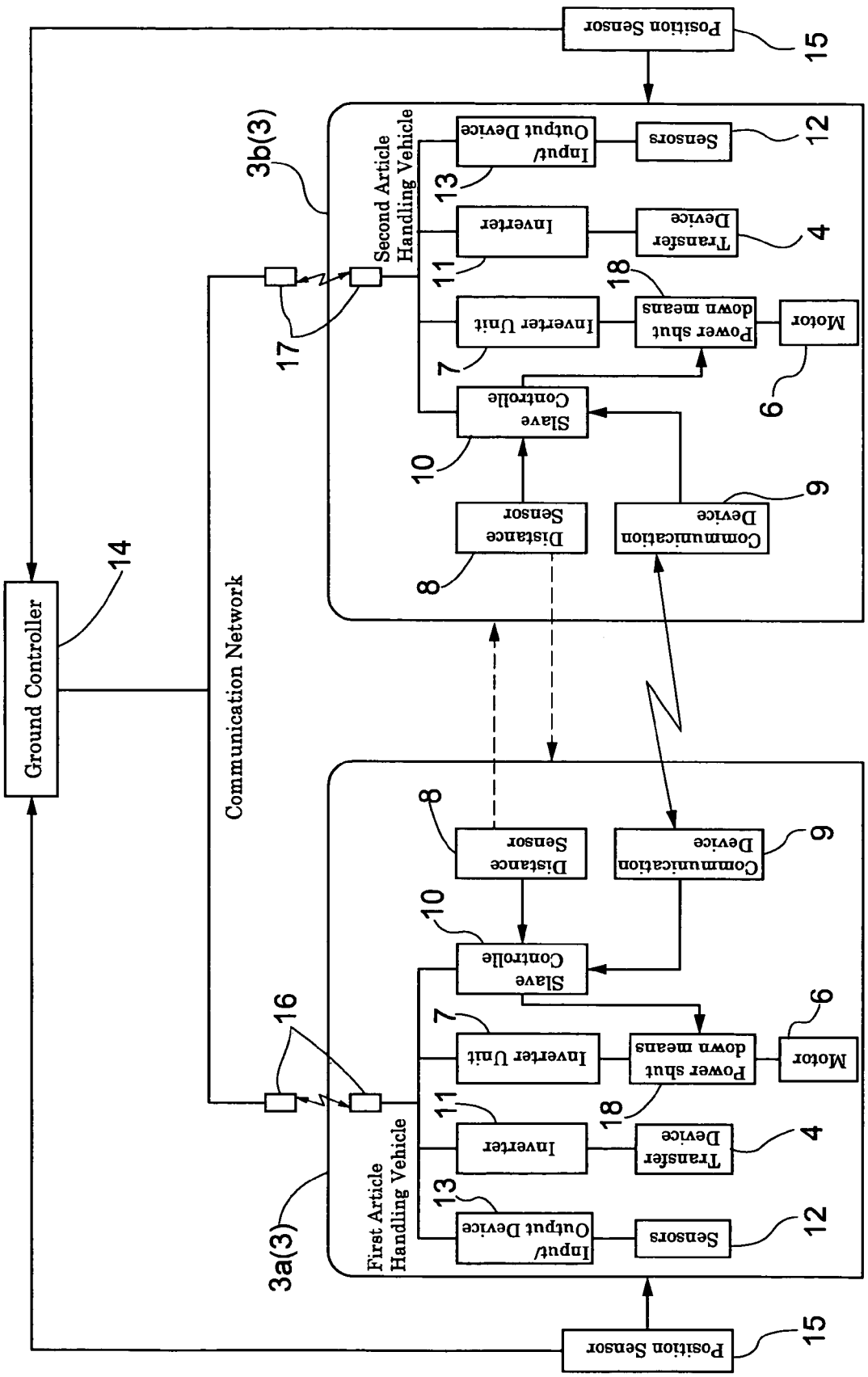
FIG. 2 is a block diagram of the transport apparatus according to the present invention.

Furthermore, as shown in FIG. 2, each of the first article handling vehicle 3a and the second article handling vehicle 3b is provided with, for example, a travel inverter unit 7 as travel driving means for operating the travel motor 6 to drive the article handling vehicle 3, a vehicle distance sensor 8 for detecting the distance to the other article handling vehicle 3, a vehicle-to-vehicle optical transmission device 9 for communicating information with the other article handling vehicle 3, a slave controller 10 for controlling the operation of the vehicle distance sensor 8, the vehicle-to-vehicle optical transmission device 9 and the like, a transfer inverter 11 for operating the transfer device 4, sensors 12 for detecting a state of the article B and the like in the transfer device 4, and an input-output device 13 with which information detected by the sensors 12 is output. The travel driving means can alternatively be any conventional control/communication circuit (s) for any conventional electric motor. The travel inverter unit 7 is provided with an inverter that controls the motor 6 by modulating power frequency and an inverter control portion that controls the inverter based on signals sent to the inverter unit 7. The inverter control portion has a CPU and a memory and stores a mapping information that associates a speed control signal sent from the speed command information.

On the ground-side such as a floor surface, one ground-side controller 14 for managing the operation of the first article handling vehicle 3a and the second article handling vehicle 3b is provided, and the ground-side controller 14 is configured so as to control the operation of, for example, the travel inverters 7 and the transfer inverters 11 in the first article handling vehicle 3a and the second article handling vehicle 3b.

Furthermore, each of the ends 2a and 2b of the path 2 is provided with a position detection sensor 15 as a position detection means for detecting the distance from the end to the article handling vehicles 3, so as to detect the positions of the article handling vehicles 3 on the path 2. The position detection sensor 15 or other sensors described in this specification are preferably laser-based distance detectors although the sensors can be of any conventional type measuring the position by utilizing sounds or electromagnetic waves. For example, it is possible to use sensors provided with an emitting device for emitting a laser beam or other electromagnetic waves or sounds and a receiving device for receiving the laser beam or other electromagnetic waves or sounds reflected by reflection boards provided on the article handling vehicles 3.

Although not shown, the ground-side controller 14 provided on the ground-side, and each of the travel inverters 7, the slave controllers 10 which are provided separately from the control portions of the travel inverter unit 7, the transfer inverters 11, and the input-output devices 13 provided on the article handling vehicles 3 are provided with a communication controller. A first optical transmission device 16 for sending and receiving information between the ground-side controller 14 and the first article handling vehicle 3a and a second optical transmission device 17 for sending and receiving information between the ground-side controller 14 and the second article handling vehicle 3b are also provided. The first optical transmission device 16 has the ground-side optical transmission device 16a and the vehicle-side optical transmission device 16b while the second optical transmission device 17 has the ground-side optical transmission device 17a and the vehicle-side optical transmission device 17b. The ground-side optical transmission device 16a (or 17a) and the vehicle-side optical transmission device 16b (or 17b) communicate with each other by sending optical signals along one of the rails.

A communication network, that is, a so-called "device-network" is constituted by the communication controller provided on the ground-side controller 14, the communication controllers provided on the article handling vehicles 3, the first optical transmission device 16, and the second optical transmission device 17. The ground-side controller 14 serves as the master unit, and the travel inverters 7, the slave controllers 10, the transfer inverters 11, and the input-output devices 13 serve as the slave units.

The information detected by the position detection sensors 15 provided at both of the ends 2a and 2b of the path 2 is configured so as to be input into the ground-side controller 14, and the ground-side controller 14 is configured so as to manage the positions of the first article handling vehicle 3a and the second article handling vehicle 3b on the path 2 based on the information detected by the position detection sensors 15 and on the mapping information stored in the ground-side controller 14.

In this manner, the ground-side controller 14 is configured so as to manage the operation of the first article handling vehicle 3a and the second article handling vehicle 3b by giving various instruction information to the first article handling vehicle 3a and the second article handling vehicle 3b via the communication network while managing the positions of the first article handling vehicle 3a and the second article handling vehicle 3b on the path 2.

The ground-side controller 14 manages the operation of the two article handling vehicles 3, so that the article B is transferred between the objective station 1 and either one of the first article handling vehicle 3a and the second article handling vehicle 3b, based on transport request data that specifies the objective station 1 from among the plurality of stations 1.

Describing the operation of the two article handling vehicles 3 more specifically, the ground-side controller 14 is configured so as to perform a specification process to select the article handling vehicle 3 for a transport process from the first article handling vehicle 3a and the second article handling vehicle 3b based on the transport request data, to run the article handling vehicle 3 specified for the transport process in the specification process to the objective station 1, and then to perform the transport process for transferring the article B to/from the objective station 1.

Every time transport request data is generated, the ground-side controller 14 repeatedly performs the specification process and the transport process in this order, to transfer the article B between the plurality of stations 1 using the two article handling vehicles 3.

Furthermore, the ground-side controller 14 is configured so as to manage the operation of the article handling vehicles 3, treating the transport process for receiving that runs the article handling vehicle 3 assigned to the objective station 1 in order receive the article B, and the transport process for delivering that runs the article handling vehicle 3 assigned to the objective station 1 in order to deliver the article B and that is performed after the transport process for receiving, which are transport processes based on the transport request data, as separate transport processes.

In addition, the ground-side controller 14 is configured so as to, firstly, run the article handling vehicle 3 selected for the transport process to the objective station 1 to receive the article B by performing the specification process and then the transport process for receiving, and then after performing the transport process for receiving, to run the article handling vehicle 3 selected for the transport process to the objective station 1 to deliver the article B by performing the specification process and then the transport process for delivering.

Regarding transport request data, the transport request data can be input, into the ground-side controller 14, from, for example, a manually operated input device such as a keyboard, or a host computer, and examples include information for specifying an objective station 1, from which the article B is received, and an objective station 1, to which the article B is delivered.

Describing the specification process more specifically, the ground-side controller 14 is configured so as to select the article handling vehicle 3 for executing the transport process from among the first article handling vehicle 3a and the second article handling vehicle 3b, based on various conditions such as whether the article handling vehicle 3 is performing the transport process for receiving or the transport process for delivering, whether or not the first article handling vehicle 3a or the second article handling vehicle 3b is currently performing the transport process, and the position of the first article handling vehicle 3a and the second article handling vehicle 3b on the path 2.

That is to say, when performing the transport process for receiving, if neither of the two article handling vehicles 3 are currently performing the transport process and both of them are on standby, then the ground-side controller 14 selects the article handling vehicle 3 positioned near the objective station 1 from the first article handling vehicle 3a and the second article handling vehicle 3b, as the article handling vehicle 3 for the transport process.

If one vehicle is currently performing the transport process and the other is on standby, then the ground-side controller 14 selects the article handling vehicle 3 that is on standby, as the article handling vehicle 3 for the transport process, when the transport process performed by the article handling vehicle 3 on standby does not interfere with the article handling vehicle 3 currently performing the transport process.

Furthermore, when performing the transport process for delivering, if the other article handling vehicle 3 is on standby, then the ground-side controller 14 is configured so as to select the article handling vehicle 3 after performing the transport process for receiving, as the article handling vehicle 3 for the transport process.

If the other article handling vehicle 3 is currently performing the transport process, then the ground-side controller 14 is configured such that when the article handling vehicle 3 that has performed the transport process for receiving can perform the transport process without interfering with the other article handling vehicle 3 that is currently performing the transport process, the ground-side controller 14 selects the article handling vehicle 3 that has performed the transport process for receiving as the article handling vehicle for the transport process.

As described above, the ground-side controller 14 performs the specification process to select the article handling vehicle 3 for the transport process in such a manner that, in accordance with the sequence in which the transport request data is generated, the generated transport request data is satisfied within a range in which the article handling vehicle 3 currently performing the transport process is not interfered with.

Furthermore, in the specification process, if the article handling vehicle 3 that is currently performing the transport process will be interfered with, the ground-side controller 14 is configured so as to either put the other article handling vehicle 3 on standby at its current position without selecting the article handling vehicle 3 as the article handling vehicle 3 for the transport process, or to execute an excluding operation that moves the article handling vehicle 3 to a position that does not interfere with the article handling vehicle 3 that is currently performing the transport process.

A case will be described in more detail in which in the specification process, for example, the first article handling vehicle 3a is selected as the article handling vehicle 3 for the transport process and the transport process is performed using the first article handling vehicle 3a.

Every time a set time period passes, the ground-side controller 14 transmits run command information such as a run start command and speed command information to the inverter control portion of the travel inverter unit 7 of the first article handling vehicle 3a, via the communication network such as the first optical transmission device 16.

The travel inverter unit 7 of the first article handling vehicle 3a drives the first article handling vehicle 3a while adjusting its running speed, by adjusting a property or properties of the electric current, such as its frequency, to the travel motor 6 based on the run command information from the ground-side controller 14.

Furthermore, since the information detected by the position detection sensor 15 is input into the ground-side controller 14, the ground-side controller 14 drives the first article handling vehicle 3a while managing the running position of the first article handling vehicle 3a.

Thus, in a state in which the ground-side controller 14 drives the first article handling vehicle 3a while managing the running position thereof, when the running position of the first article handling vehicle 3a reaches a target stopping position corresponding to the objective station 1, stop command information is transmitted to the travel inverter unit 7 of the first article handling vehicle 3a, via the communication network such as the first optical transmission device 16.

The travel inverter unit 7 of the first article handling vehicle 3a is configured so as to operate the travel inverter 6 so as to apply the brake to slow the first article handling vehicle 3a, and to stop the first article handling vehicle 3a in the target stopping position based on the stop command information from the ground-side controller 14.

If the running direction of the first article handling vehicle 3a is the same as the running direction of the second article handling vehicle 3b, then the ground-side controller 14 is configured so as to transit the run command information to the travel inverter unit 7 of the first article handling vehicle 3a such that the distance between the two article handling vehicles 3 is not less than a set vehicle-to-vehicle distance.

More specifically, if the second article handling vehicle 3b is already moving when the first article handling vehicle is moved, the ground-side controller 14 is configured so as to distinguish whether or not the running direction of the first article handling vehicle 3a is the same as the running direction of the second article handling vehicle 3b.

If the running direction of the first article handling vehicle 3a and the second article handling vehicle 3b are the same, then the ground-side controller 14 is configured so as to transmit the speed command information to the travel inverter unit 7 of the first article handling vehicle 3a so as to adjust the running speed of the first article handling vehicle 3a so that the distance between the article handling vehicles 3 is not less than the set vehicle-to-vehicle distance.

Herein, the set vehicle-to-vehicle distance is determined to be a distance obtained by deducting the stopping distance required when applying the brake to stop the second article handling vehicle 3b, from the stopping distance required when performing a normal deceleration to stop the first article handling vehicle 3a.

The ground-side controller 14 is configured so that when the first article handling vehicle 3a is stopped in the target stopping position, it transmits the transfer command information to the transfer inverter 11 of the first article handling vehicle 3a via the communication network such as the first optical transmission device 16.

The transfer inverter 11 of the first article handling vehicle 3a is configured so as to activate the transfer device 4 to receive the article B that is present on the objective station 1, or to deliver the article B to the objective station 1 based on the transfer command information from the ground-side controller 14.

Furthermore, the input-output device 13 is configured so as to transmit the information detected by the sensors 12 to the ground-side controller 14 via the communication network such as the first optical transmission device 16, and the ground-side controller 14 is configured so as to confirm that the article B has been transferred to or from the objective station 1 based on the information from the input-output output device 13.

Thus, an improvement in the transport capacity can be achieved when the ground-side controller 14 directly transmits the information for running and for stopping the article handling vehicle 3 to the travel inverter unit 7 to directly control the operation of the travel inverter unit 7, and to reduce the vehicle-to-vehicle distance between the two article handling vehicles 3 as much as possible.

The ground-side controller 14 is configured so that it can manage the operation of the two article handling vehicles 3 simply by transmitting run command information and stop command information to the travel inverters 7, and thus the configuration can be simplified.

Moreover, the transport apparatus is configured such that the controllers for managing the operation of the two article handling vehicles 3 can be concentrated in the single ground-side controller 14, and such that the configuration can contribute to productivity increases, such as programs for managing the operation of the two article handling vehicles 3 by unified management by the ground-side controller 14.

By providing the first article handling vehicle 3a and the second article handling vehicle 3b with vehicle distance sensors 8 and slave controllers 10 that are independent of the ground-side controller 14, the risk of the article handling vehicles 3 accidentally colliding due to aberrant control by the ground-side controller 14 is prevented.

More specifically, the slave controllers 10 monitor the relative distance and the relative speed between the article handling vehicles 3 based on the information detected by the vehicle distance sensors 8, and if there is a potential for the article handling vehicles 3 to collide, forcibly stop the movement of the article handling vehicles 3.

That is to say, the slave controllers 10 are configured so that when the relative distance between vehicles is equal to or greater than an allowable distance between vehicles, or when the relative speed is equal to or greater than an allowable relative speed, they activate power stopping means 18 for stopping the supply of power to the travel motors 6 so as to stop the supply of power to the travel motors 6 and thereby stop the article handling vehicles 3.

The configuration of the slave controllers 10 is such that the slave controller 10 on one article handling vehicle 3 sends stop command information for stopping movement of the article handling vehicle 3 to the slave controller 10 on the other article handling vehicle 3 through the vehicle-to-vehicle optical transmission device 9, and the slave controller 10 that receives the stop command information then activates the power stopping means 18 to stop the supply of power to the travel motor 6 so as to stop the article handling vehicle 3.

Other Embodiments (1) In the aforementioned embodiment, the ground-side controller 14 manages the positions of the plurality of article handling vehicles 3 on the path 2 based on information detected by the position detection controllers 15. However, the ground-side controller 14 can also manage the positions of the plurality of article handling vehicles 3 on the path 2, for example, by providing an encoder on each of the article handling vehicles 3, and by communicating information detected by the encoders via the input-output devices 13 to the ground-side controller 14.

(2) In the aforementioned embodiment, the ground-side controller 14 transmits run command information to the travel inverters 7 so that the distance between the article handling vehicles 3 is a set vehicle-to-vehicle distance or longer, when the plurality of article handling vehicles 3 run in the same direction on the path 2. However, for example, if the plurality of article handling vehicles 3 are run in the same direction on the path 2, then the configuration of the ground-side controller 14 can be changed to transmit any type of run command information to the travel inverters 7 as appropriate, for example, to transmit speed command information to the travel inverters 7 such that the running speed of the article handling vehicles 3 is the same when the plurality of article handling vehicles 3 are run in the same direction.

(3) In the aforementioned embodiment, the ground-side controller 14 is configured so as to perform the specification process to select the article handling vehicle 3 that is to perform the transport process, from among the first article handling vehicle 3a and the second article handling vehicle 3b based on various conditions, however the conditions for selecting the article handling vehicle 3 that is to perform the transport process, from among the first article handling vehicle 3a and the second article handling vehicle 3b, may be changed as appropriate.

(4) In the aforementioned embodiment, an example is shown in which the plurality of stations 1 are arranged in the right and left of the path 2 uniformly, as shown in FIG. 1. However, the number of the stations 1 or the positions at which the stations 1 are arranged can be changed as appropriate.

(5) The aforementioned embodiment describes an example in which a vehicle distance sensor 8 and a slave controller 10 are provided in each of the two article handling vehicles 3, but it is also possible to adopt a configuration in which the vehicle distance sensor 8 and the slave controller 10 are provided in only one of the two article handling vehicles 3, and if there is a possibility that the relative distance between vehicles will be equal to or greater than an allowable distance between vehicles or that the relative speed will be equal to or greater than an allowable relative speed, for the one article handling vehicle 3, through the vehicle-to-vehicle optical transmission device 9, to notify the other article handling vehicle 3 that there is a possibility of a collision, and for the other article handling vehicle 3 to be stopped in accordance with that communication.

(6) The aforementioned embodiment illustratively describes a case in which two article handling vehicles 3 are provided, but the number of article handling vehicles 3 can be altered where appropriate.

(7) In the aforementioned embodiment, the article handling vehicles 3 are shown as examples of article transporting vehicles, but it is also possible to employ stacker cranes that run back and forth along a path between a pair of article storage shelves, for example, as the article transporting vehicles, and it is also possible to use article transporting vehicles other than the article handling vehicles 3.

What is claimed is:

1. A transport apparatus, comprising:
at least one rail that extends past a plurality of article transfer stations and that has a first end and a second end;
a plurality of article transporting vehicles that travel back and forth on and share the rail;

a position sensor that is fixed, at each of the first end and the second end, with respect to a floor and detects a position of each of the plurality of article transporting vehicles on the rail;

an electric motor configured to control the article transporting vehicle provided on each of the article transporting vehicles;

an inverter configured to control power to the electric motor;

an inverter control portion configured to control the inverter provided on each of the article transporting vehicles;

a ground-side controller that is fixed with respect to a floor, that is signally connected to the position sensor, and that generates a first control signal based on a detection result from the position sensor in order to manage the movement of the plurality of article transporting vehicles;

a signal transmission device, provided between the ground-side controller and the inverter control portion, configured to transmit the first control signal from the first controller to the inverter control portion;

a vehicle distance sensor provided on at least one of a pair of article transporting vehicles adjacent each other on the rail, the vehicle distance sensor configured to detect a vehicle-to-vehicle distance to the other article transporting vehicle adjacent thereto;

an onboard controller provided on each of the article transporting vehicles, said onboard controller having a direct signal transmission device configured to direct information communication with the onboard controller provided on a further article transporting vehicle adjacent thereto, said onboard controller generating second control information which is independent from the management by the ground-side controller, in accordance with at least one of a relative vehicle-to-vehicle distance and a relative speed calculated based on the vehicle-to-vehicle distance; and a second signal transmission device provided between the onboard controller and the inverter control portion configured to transmit a second control signal to the inverter control portion, wherein in collision avoid control, said second control signal overrides said first control signal.

2. The transport apparatus according to claim 1, wherein said plurality of article transporting vehicles are two article transporting vehicles, each of which includes said vehicle distance sensor and said onboard controller; and wherein when there is the risk of collision between the article transporting vehicles, the onboard controller of one of the article transporting vehicles generates second control information for controlling this article transporting vehicle and generates also stop command information for stopping the other article transporting vehicle adjacent thereto.

* * * * *